(12) United States Patent
Loehr et al.

(10) Patent No.: US 11,122,524 B2
(45) Date of Patent: Sep. 14, 2021

(54) REPORTING POWER HEADROOM

(71) Applicant: Lenovo (Singapore) PTE. LTD., New Tech Park (SG)

(72) Inventors: Joachim Loehr, Wiesbaden (DE); Alexander Johann Maria Golitschek Edler von Elbwart, Darmstadt (DE); Prateek Basu Mallick, Dreieich (DE); Ravi Kuchibhotla, Clarendon Hills, IL (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 0 days.

(21) Appl. No.: 16/724,011

(22) Filed: Dec. 20, 2019

(65) Prior Publication Data

US 2020/0205090 A1 Jun. 25, 2020

Related U.S. Application Data

(60) Provisional application No. 62/784,279, filed on Dec. 21, 2018.

(51) Int. Cl.
*H04W 52/36* (2009.01)
*H04W 72/04* (2009.01)
(52) U.S. Cl.
CPC ..... *H04W 52/365* (2013.01); *H04W 72/0413* (2013.01)
(58) Field of Classification Search
CPC .................. H04W 52/365; H04W 72/0413
USPC ........... 455/69, 522; 370/252, 328, 329, 336
See application file for complete search history.

(56) References Cited

U.S. PATENT DOCUMENTS

| | | | |
|---|---|---|---|
| 2012/0257519 A1* | 10/2012 | Frank ................ | H04W 52/16 370/252 |
| 2013/0114505 A1* | 5/2013 | Haim ................. | H04W 52/243 370/328 |
| 2013/0176952 A1* | 7/2013 | Shin .................. | H04W 72/042 370/329 |
| 2015/0181546 A1* | 6/2015 | Freda ................ | H04L 27/0014 370/336 |
| 2017/0019864 A1* | 1/2017 | Hwang .............. | H04W 52/325 |
| 2017/0367058 A1* | 12/2017 | Pelletier ............ | H04W 56/0045 |
| 2019/0014589 A1* | 1/2019 | Yerramalli ......... | H04W 52/365 |
| 2019/0045459 A1* | 2/2019 | Niu .................... | H04W 52/146 |
| 2019/0098585 A1* | 3/2019 | Golitschek Edler von Elbwart ... H04W 52/58 |

(Continued)

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.3.0, Sep. 2018, pp. 1-76.

(Continued)

*Primary Examiner* — Tan H Trinh
(74) *Attorney, Agent, or Firm* — Kunzler Bean & Adamson

(57) ABSTRACT

Apparatuses, methods, and systems are disclosed for reporting power headroom. One apparatus includes a processor that identifies a transmission occasion for AUL transmission on an unlicensed serving cell and generates a PHR MAC CE. The apparatus includes a transceiver that transmits the PHR MAC CE with an AUL transmission to a RAN node in the mobile communication network, wherein transmitting the PHR MAC CE includes indicating timing information corresponding to the PHR.

10 Claims, 8 Drawing Sheets

(56) References Cited

U.S. PATENT DOCUMENTS

| | | |
|---|---|---|
| 2019/0098657 A1* | 3/2019 | Golitschek Edler von Elbwart ... H04W 72/1242 |
| 2020/0053730 A1* | 2/2020 | Hosseini ............... H04L 5/0094 |
| 2020/0053777 A1* | 2/2020 | Babaei ................ H04W 72/042 |
| 2020/0053778 A1* | 2/2020 | Babaei .............. H04W 74/0808 |
| 2020/0100170 A1* | 3/2020 | Babaei ................. H04W 48/12 |
| 2020/0107358 A1* | 4/2020 | Basu Mallick ... H04W 74/0833 |
| 2020/0145079 A1* | 5/2020 | Marinier ............. H04B 7/0456 |

OTHER PUBLICATIONS

3GPP, "3rd Generation Partnership Project; Technical Specification Group Radio Access Network; NR; Multiplexing and channel coding (Release 15)", 3GPP TS 38.212 V15.3.0, Sep. 2018, pp. 1-99.

3GPP, "3rd Generation Partnership Project; Technical Specification Group Radio Access Network; NR; Physical layer procedures for control (Release 15)", 3GPP TS 38.213 V15.3.0, Sep. 2018, pp. 1-101.

PCT/IB20219/001358, "Notification of Transmittal of the International Search Report and the Written Opinion of the International Searching Authority, or the Declaration", dated Jul. 20, 2020, pp. 1-15.

Qualcomm Incorporation, "Remaining Issues for AUL", 3GPP TSG-RAN WG2 Meeting #101 R2-1803559, Feb. 26-Mar. 2, 2018, pp. 1-3.

* cited by examiner

300

| C7 | C6 | C5 | C4 | C3 | C2 | C1 | R |
|----|----|----|----|----|----|----|----|
| P | V | \multicolumn{6}{c|}{PH (Type 2, SpCell of the other MAC entity)} |
| R | R | \multicolumn{6}{c|}{PCMAX,f,c 1} |
| P | V | \multicolumn{6}{c|}{PH (Type 1, Pcell)} |
| R | R | \multicolumn{6}{c|}{PCMAX,f,c 2} |
| P | V | \multicolumn{6}{c|}{PH (Type X, Serving Cell 1)} |
| R | T | \multicolumn{6}{c|}{PCMAX,f,c 3} |

• • •

| | | |
|---|---|---|
| P | V | PH (Type X, Serving Cell n) |
| R | T | PCMAX,f,c m |

FIG. 3

REPORTING POWER HEADROOM

FIELD

The subject matter disclosed herein relates generally to wireless communications and more particularly relates to reporting power headroom.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Authentication, Authorization and Accounting ("AAA"), Access and Mobility Management Function ("AMF"), Access to Restricted Local Operator Services ("ARLOS"), Positive-Acknowledgment ("ACK"), Application Programming Interface ("API"), Authentication Center ("AuC"), Access Stratum ("AS"), Autonomous Uplink ("AUL"), AUL Downlink Feedback Information ("AUL-DFI"), Base Station ("BS"), Binary Phase Shift Keying ("BPSK"), Bandwidth Part ("BWP"), Clear Channel Assessment ("CCA"), Control Element ("CE"), Cyclic Prefix ("CP"), Cyclical Redundancy Check ("CRC"), Channel State Information ("CSI"), Common Search Space ("CSS"), Connection Mode ("CM", this is a NAS state in 5GS), Core Network ("CN"), Control Plane ("CP"), Data Radio Bearer ("DRB"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Service ("GPRS"), Generic Public Service Identifier ("GPSI"), Guard Period ("GP"), Global System for Mobile Communications ("GSM"), Globally Unique Temporary UE Identifier ("GUTI"), Hybrid Automatic Repeat Request ("HARQ"), Home Subscriber Server ("HSS"), Home Public Land Mobile Network ("HPLMN"), Information Element ("IE"), Internet-of-Things ("IoT"), International Mobile Subscriber Identity ("IMSI"), Licensed Assisted Access ("LAA"), Load Based Equipment ("LBE"), Listen-Before-Talk ("LBT"), Long Term Evolution ("LTE"), Multiple Access ("MA"), Mobility Management ("MM"), Mobility Management Entity ("MME"), Modulation Coding Scheme ("MCS"), Machine Type Communication ("MTC"), Multiple Input Multiple Output ("MIMO"), Mobile Station International Subscriber Directory Number ("MSISDN"), Multi User Shared Access ("MUSA"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Exposure Function ("NEF"), Non-Orthogonal Multiple Access ("NOMA"), Network Slice Selection Assistance Information ("NSSAI"), Operation and Maintenance System ("OAM"), Orthogonal Frequency Division Multiplexing ("OFDM"), Packet Data Unit ("PDU", used in connection with 'PDU Session'), Packet Switched ("PS", e.g., Packet Switched domain or Packet Switched service), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RM", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Session Management ("SM"), Session Management Function ("SMF"), Service Provider ("SP"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Supplementary Uplink ("SUL"), Subscriber Identification Module ("SIM"), Tracking Area ("TA"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Unified Access Control ("UAC"), Unified Data Management ("UDM"), User Data Repository ("UDR"), Uplink Control Information ("UCI"), User Entity/Equipment (Mobile Terminal) ("UE"), UE Configuration Update ("UCU"), UE Route Selection Policy ("URSP"), Uplink ("UL"), User Plane ("UP"), Universal Mobile Telecommunications System ("UMTS"), UMTS Subscriber Identification Module ("USIM"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

For LTE eLAA, autonomous uplink (AUL) transmissions can be enabled through a combination of RRC signaling and an activation message conveyed by a DCI in a physical control channel. The RRC configuration includes subframes in which the UE is allowed to transmit autonomously, as well as eligible HARQ process IDs. The activation message includes the resource block assignment (RBA) and MCS, from which the UE is able to determine the transport block size for any AUL transmission.

When autonomous uplink (AUL) for unlicensed access in NR (NR-U) is used, the gNB may be unable to determine when an UL transmission/TB was initially generated due to potential LBT failures, even if the following (re)transmission of the same HARQ process are correctly decoded by the gNB. Such uncertainty may have in particular for PHR transmissions some negative impact, because the PHR content at the time of the transmission may not really reflect the status when it was generated.

BRIEF SUMMARY

Disclosed are procedures for reporting power headroom. Apparatuses and systems also perform the functions of the methods. The methods may also be embodied in one or more computer program products comprising a computer readable storage medium that stores executable code that, when executed by a processor, perform the steps of the methods.

One method of a UE for reporting power headroom includes identifying a transmission occasion for AUL transmission on an unlicensed serving cell. The method includes generating a power headroom report ("PHR") Medium Access Control ("MAC") Control Element ("CE") and transmitting the PHR MAC CE with an AUL transmission to a RAN node in the mobile communication network, wherein transmitting the PHR MAC CE includes timing information corresponding to the PHR.

Another method of a UE for reporting power headroom includes identifying a first transmission occasion for AUL transmission on an unlicensed serving cell and generating a PHR MAC CE including power headroom information for each activated serving cell configured with uplink, wherein the power headroom information for an activated serving cell is calculated for a predetermined PHR type in response to the serving cell being configured with two UL carriers. The method includes transmitting the PHR MAC CE in an AUL transmission to a RAN node in the mobile communication network.

Yet another method of a UE for reporting power headroom includes identifying a first transmission occasion on a configured uplink grant resource. The method includes generating a PHR MAC CE including power headroom information for each activated serving cell and transmitting the PHR MAC CE to a RAN node in the mobile communication network. Here, the power headroom information is calculated for a predetermined PHR type in response to a serving cell being configured with two UL carriers.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a diagram illustrating one embodiment of a MAC control element for power headroom reporting;

DETAILED DESCRIPTION

Figure 1:
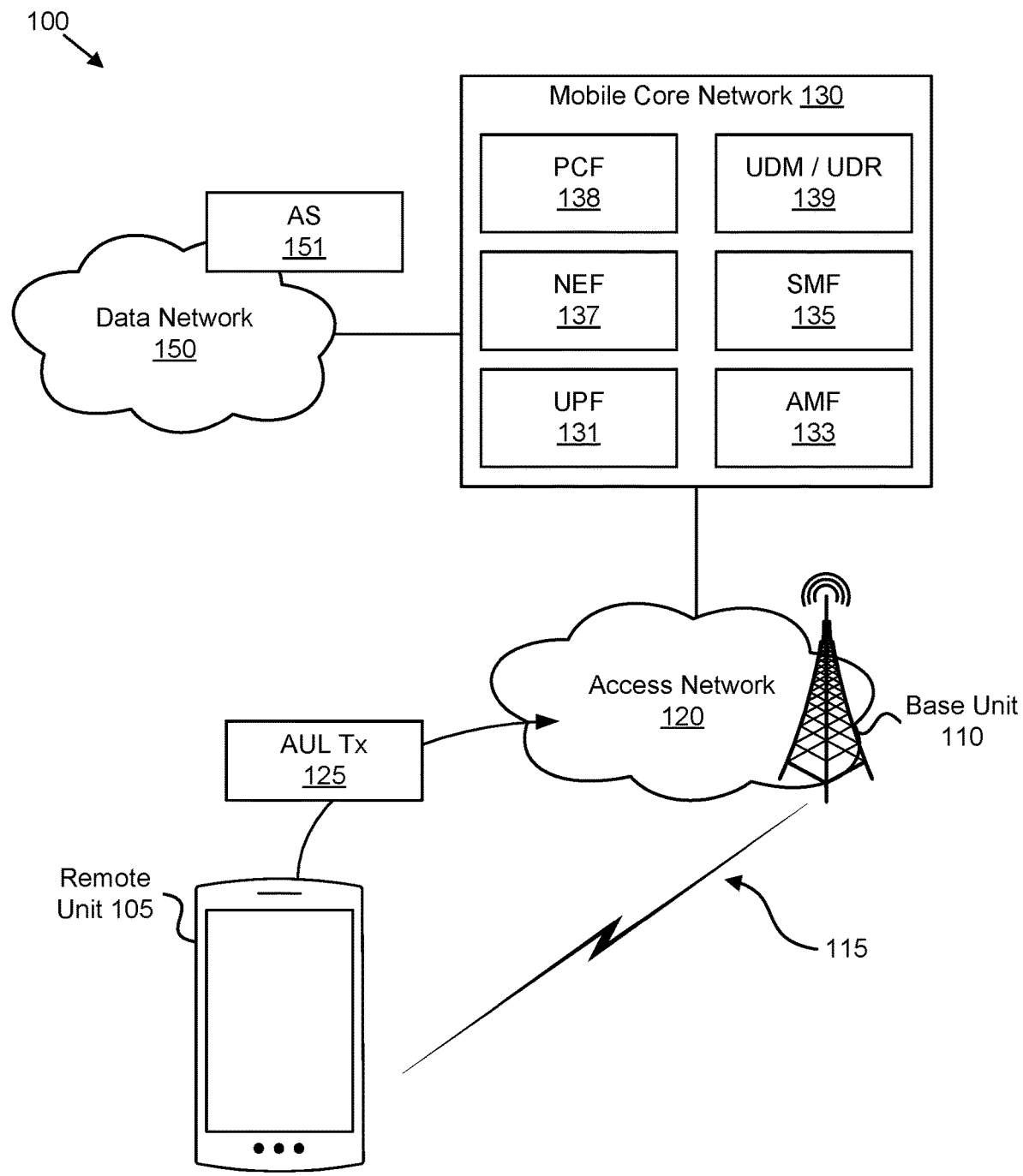
FIG. 1 is a schematic block diagram illustrating one embodiment of a wireless communication system for reporting power headroom.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an objectoriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

[Invention Overview]

Generally, the present disclosure describes systems, methods, and apparatus for reporting power headroom. In certain wireless communications networks, such as LTE eLAA, autonomous uplink ("AUL") transmissions are enabled through a combination of RRC signaling and an activation message conveyed by a DCI in a physical control channel. The RRC configuration includes subframes in which the UE is allowed to transmit autonomously, as well as eligible HARQ process IDs. The activation message includes the resource block assignment ("RBA") and a modulation and coding scheme ("MCS"), from which the UE is able to determine the transport block size for any AUL transmission.

It is possible to autonomously retransmit data pertaining to a transport block that has not been received correctly by the eNB. For this purpose, the UE monitors AUL downlink feedback information (e.g., "AUL-DIP"), transmitted by the eNB. The AUL-DFI includes HARQ-ACK information for the AUL-enabled HARQ process IDs. In case the UE detects a NACK message, it may try to autonomously access the channel for a retransmission of the same transport block in the corresponding HARQ process. As a safe-guard against errors, an AUL transmission includes at least the HARQ process ID and a new data indicator ("NDI") accompanying the PUSCH. In various embodiments, the AUL transmission includes uplink control information, AUL-UCI, which contains the HARQ process ID and NDI.

It is also possible for the eNB to transmit an uplink grant through a DCI that assigns uplink resources for a retransmission of the same transport block using the indicated HARQ process. It is further possible that the eNB transmits an uplink grant through a DCI that assigns uplink resources for a transmission of a new transport block using the indicated HARQ process. In other words, even though a HARQ process ID may be eligible for AUL transmissions, the eNB still has access to this process at any time through a scheduling grant (e.g., in DCI). Conventionally, if the UE detects a grant for an UL transmission for a subframe that is eligible for AUL (according to the RRC configuration), it will follow the received grant and will not perform an AUL transmission in that subframe.

When AUL for unlicensed access in NR (referred to as AUL for NR-U) is used, the gNB may be unable to determine when an UL transmission/TB was initially generated due to potential listen-before-talk ("LBT") failures, even if the following (re)transmission of the same HARQ process are correctly decoded by the gNB. For PHR transmissions, in particular, such uncertainty may have some negative impact, because the PHR content at the time of the transmission may not accurately reflect the status when it was generated. That could affect UL scheduling and link adaptation.

A more serious problem is that for the SUL case, e.g., UE is configured with two UL carriers for a serving cell, gNB needs to know when PHR was generated in order to know what PHR type is reported in the PHR MAC CE, e.g., type-1 or type-3 PHR. Currently, the UE is to report either type-1 or type-3 PH depending on whether UE determined a real or virtual PH for the two carriers.

If a UE is configured with two UL carriers for a serving cell and if the UE reports a UE capability "simultaneousTxSUL-NonSUL" for the serving cell, and if the UE determines that Type-1 power headroom report for the serving cell is based on a reference PUSCH transmission and Type-3 power headroom report for the serving cell is based on a reference SRS transmission, the UE provides the Type-1 PHR.

If a UE is configured with two UL carriers for a serving cell and if the UE reports a UE capability "simultaneousTxSUL-NonSUL" for the serving cell, and if the UE determines that a power headroom for only one of the two UL carriers of the serving cell is based on an actual transmission, the UE provides a Type-1 PHR when the actual transmission is a PUSCH transmission, or provides a Type-3 PHR when the actual transmission is an SRS transmission.

In order to know at the gNB side whether the reported PHR value is a type-1 or type-3 PHR the gNB needs to know which grants are considered for the PH determination. Therefore, the gNB basically needs to know when the PHR was generated in order to understand whether the PHR MAC CE contains a PHR type-1 or PHR type-3 report. It should be noted that the PHR MAC CE format (multiple entry PHR MAC CE) doesn't explicitly indicate the PHR type, according to TS 38.321 v15.3.0.

This disclosure contains embodiments providing solutions for reporting power headroom. In a first solution, the UE signals timing information to the RAN node such as gNB, eNB or the like indicating whether the corresponding uplink transmission denotes the first transmission attempt or a second or later transmission attempt. In a second solution, the UE updates the content of a MAC CE contained in a TB for each transmission attempt. In a third solution, the UE always reports a predefined PHR type, e.g., type-1 PHR, when the PHR MAC CE is transmitted on an unlicensed cell. In a fourth solution, a field in the PHR MAC CE indicates the type of reported PH value. In a fifth solution, the UE prioritizes transmission of a PHR MAC CE on a licensed cell over transmissions of a PHR MAC CE on an unlicensed cell. In a sixth solution, the UE reports a virtual PHR for a predefined PHR type, e.g., PHR type-1, for a serving cell configured with two UL carriers.

[FIG. 1]

FIG. 1 depicts an embodiment of a wireless communication system 100 for accessing a denied network resource, according to various embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the NR system specified in the 3GPP specifications and/or the LTE system specified in 3GPP. More generally, however, the wireless communication system 100 may implement some other open or proprietary communication network, for example, WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115.

In some embodiments, a remote unit 105 may decide to establish a data connection (e.g., a PDU session) with an application server ("AS") 151 in the data network 150 via the mobile core network 130. Here, the data path of a PDU session may be established over one of the multiple network slices supported by the mobile core network 130. The specific network slice used by the PDU session may be determined by the S-NSSAI attribute of the PDU session. Here, the remote unit 105 may be provisioned with Network Slice Selection Policy ("NSSP") rules which it uses to determine how to route a requested PDU session.

The base units 110 may be distributed over a geographic region. In certain embodiments, a base unit 110 may also be referred to as a RAN node, an access terminal, a base, a base station, a Node-B, an eNB, a gNB, a Home Node-B, a relay node, a femtocell, an access point, a device, or by any other terminology used in the art. The base units 110 are generally part of an access network 120, such as a radio access network ("RAN"), that may include one or more controllers communicably coupled to one or more corresponding base units 110. These and other elements of the access network 120 are not illustrated but are well known generally by those having ordinary skill in the art. The base units 110 connect to the mobile core network 130 via the access network 120. The access network 120 and mobile core network 130 may be collectively referred to herein as a "mobile network" or "mobile communication network."

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC"), which may be coupled to a data network 150, like the Internet and private data networks, among other data networks. In some embodiments, the remote units 105 communicate with an application server ("AS") 151 (external to the mobile core network 130) via a network connection with the mobile core network 130. Each mobile core network 130 belongs to a single public land mobile network ("PLMN"). The present disclosure is not intended to be limited to the implementation of any particular wireless communication system architecture or protocol. For example, other embodiments of the mobile core network 130 include an enhanced packet core ("EPC") or a Multi-Service Core as describe by the Broadband Forum ("BBF").

The mobile core network 130 includes several network functions ("NFs"). As depicted, the mobile core network 130 includes at least one user plane function ("UPF") 131. The mobile core network 130 also includes multiple control plane functions including, but not limited to, an Access and Mobility Management Function ("AMF") 133 that serves the access network 120, a Session Management Function ("SMF") 135, a Network Exposure Function ("NEF") 137, a Policy Control Function ("PCF") 138, a Unified Data Management and Unified Data Repository function ("UDM/UDR") 139. Control plane network functions provide services such as UE registration, UE connection management, UE mobility management, session management, and the like. In contrast, a UPF provides data transport services to the remote units 105. In certain embodiments, the mobile core network 130 may also include, an Authentication Server Function ("AUSF"), a Network Repository Function ("NRF") (used by the various NFs to discover and communicate with each other over application programming interfaces ("APIs")), or other NFs defined for the 5GC.

The NEF 137 supports exposure of capabilities and events, secure provision of information from external application to 3GPP network, translation of internal/external information. The UDM/UDR 139 comprises a Unified Data Management ("UDM") and its internal component User Data Repository ("UDR"). The UDR holds subscription data including policy data. Specifically, the policy data stored by the UDM/UDR 139 includes the NSSP.

Although specific numbers and types of network functions are depicted in FIG. 1, one of skill in the art will recognize that any number and type of network functions may be included in the mobile core network 130. Moreover, where the mobile core network 130 is an EPC, the depicted network functions may be replaced with appropriate EPC entities, such as an MME, SGW, PGW, HSS, and the like. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed.

The network slices are logical networks within the mobile core network 130. In certain embodiments, the network slices are partitions of resources and/or services of the mobile core network 130. Different network slices may be used to meet different service needs (e.g., latency, reliability, and capacity). Examples of different types of network slices include enhanced mobile broadband ("eMBB"), massive machine-type communication ("mMTC"), and ultra-reliability and low latency communications ("URLLC"). A mobile core network 130 may include multiple network slice instances of the same network slice type. Different network slice instance of the same type may be distinguished by a slice "tenant" (also known as "slice differentiator") associated with the instance.

Due to LBT failures the base unit 110 might not be aware of the time when the UE generated the TB transmitted on a configured grant resource and hence is not aware of when the PHR was calculated. There are basically two problems caused by this timing uncertainty. The first issue is that the base unit 110 doesn't know for which UL resource allocation, e.g. PRBs allocated in the slot for which PHR was calculated, the PH was calculated/reported and hence may draw some wrong conclusions for the future scheduling. Secondly the base unit 110 may not be aware of the reported PHR type—for cases when a serving cell is configured with two UL carriers—and may hence interpret the reported PH values incorrectly which in turn may lead to future scheduling decisions negatively impacting the performance.

To resolve the above noted problems with PHR reporting for an AUL transmission 125, a remote unit 105 may perform one or more of: communicate timing information as part of AUL-UCI, update PH values for second/subsequent transmission attempts, always report using a predefined PHR type when transmitting a PHR MAC CE on an AUL PUSCH, and/or apply a policy rule for PHR type.

According to a first solution, the remote unit 105 signals timing information related to the calculation of the power headroom information to the base unit 110 (a RAN node, such as gNB, eNB or the like) indicating whether the corresponding uplink transmission corresponds to 1) a first transmission attempt or 2) a second or later transmission attempt. Because the remote unit 105 must first undergo a CCA (Clear Channel Assessment) procedure before a transmission can be made on the unlicensed spectrum, the remote unit 105 may be unable to transmit a generated TB immediately at the first transmission occasion/attempt, e.g., due to the CCA procedure not being successful for the first transmission attempt, but may only be able to transmit the generated TB at a later point of time when LBT (Listen Before Talk) is successful.

The timing information may be used by the base unit 110 (RAN node) for future scheduling/link adaption. In particular when receiving a PHR MAC CE, it is important to be aware at the base unit 110 when the PHR information was calculated in the remote unit 105, in order to interpret the reported PH values correctly.

According to one implementation of the first solution, the timing information may be signaled by a one-bit field/flag. For example, when set to '1' the flag indicates that uplink transmission takes place at the first transmission occasion/attempt, e.g., CCA was successful. Similarly, the flag set to '0' indicates that the uplink transmission is done at the second or later transmission attempt, e.g., generated TB couldn't be transmitted immediately because CCA wasn't successful. In other embodiments, the flag values may be switched such that a value of '0' indicated a first transmission attempt and a value of '1' indicates a second or later transmission attempt.

According to another implementation of the first solution, the timing information may indicate the offset (e.g., in number of frames, slots, subframes, or symbols) to the first transmission attempt using multiple bits. In case CCA is successful for the first transmission attempt, e.g., generated TB is immediately transmitted on corresponding next available PUSCH occasion, the timing information would indicate a "zero" slot/symbol offset. Accordingly, when the transmission of the TB takes place 5 slots after the first transmission attempt, e.g., LBT failed before, the timing information will indicate a 5 slot offset. As an alternative, the timing information may indicate the number of transmission attempts respectively the number of LBT failures for the TB until CCA was successful, e.g., using multiple bits.

According to certain implementations of the first solution, the timing information is transmitted as part of uplink control information (UCI), which is transmitted independently from the PUSCH transmission (transport block). The UCI conveying the timing information is encoded separately from the PUSCH data. Hence, the base unit 110 receiver will decode the UCI separately form the PUSCH. In one implementation of the first embodiment the timing information is carried within the AUL-UCI.

[FIG. 2]

Figure 2:
FIG. 2 is a diagram illustrating one embodiment of uplink control information for autonomous uplink transmission.

FIG. 2 depicts one embodiment of an AUL-UCI 200, according to embodiments of the disclosure. The AUL-UCI 200 contains a plurality of fields, including the AUL-RNTI 205, the HARQ process number 210, the redundancy version ("RV") 215, a New Data Indicator ("NDI") 220, the PUSCH starting symbol 225, the PUSCH ending symbol 230, and channel occupancy time ("COT") sharing indication 235. Importantly, the AUL-UCI 200 contains a 'PH timing information' field 240, $_{[JL1][BWP2]}$indicating timing related to the calculation of the power headroom information. As depicted, the PH timing information 240 may be represented by three bits in the AUL-UCI. In one embodiment, the PH timing information 240 indicates the number of transmission attempts. In another embodiment, the PH timing information 240 indicates the offset to the first transmission attempt. The information carried within this field is used in the scheduler/gNB for future scheduling/link adaption. It basically provides the base unit 110 with the information when the TB was generated.

According to a second solution, the remote unit 105 updates the content of a MAC CE contained in a TB for each transmission attempt. For example, in case a generated TB was unable to be transmitted at a transmission (PUSCH) occasion due to LBT failure, the remote unit 105 will update the content of the MAC CEs carried within the TB for the next transmission attempt. Put another way, the MAC CEs in a TB are to always indicate the most up-to date values.

In particular, for a PHR MAC CE contained in a TB, the remote unit 105 may update the reported PH values for each transmission attempt such that the base unit 110—when receiving a PHR MAC CE—is aware of when the reported PH values were calculated, e.g., the base unit 110 knows what control information (such as uplink grants and configured grants) were considered for the calculation of the reported PHR. The second solution also ensures that the base unit 110 is aware of what type of PHR is reported within the PHR MAC CE, e.g., whether type-1 or type-3 PHR is reported for a cell configured with two UL carriers (SUL and NUL).

Apart from the PHR MAC CE, also it may be beneficial for the scheduler to update the BSR MAC CE indicating the buffer status of the remote unit 105 for each transmission attempt. According to one implementation of the second embodiment only the values reported within a MAC CE, e.g., PHR MAC CE, are updated for each transmission attempt, but the PDU format of the MAC CE is not changed. Doing so ensures that the remote unit 105 doesn't need to run the logical channel prioritization (LCP) procedure again.

According to a third solution, the remote unit 105 always reports a predefined PHR type, e.g., type-1 PHR, for a serving cell which is configured with two (uplink) carriers (e.g., SUL and NUL) and/or for cases when the PHR MAC CE is transmitted on an unlicensed serving cell. As mentioned above, according to the current defined UE behavior in standards, the remote unit 105 reports either a type-1 or type-3 PHR report for a serving cell configured with two carriers depending on whether an actual PUSCH or SRS transmission takes place on the carriers in the reporting slot. Therefore, the base unit 110 needs to know when the remote unit 105 determined the PHR types for the serving cells in order to know what information is included in the PHR MAC CE, e.g., PHR type-1 or PHR type-3.

According to various implementations of the third solution, a new/special rule for PHR value determination (PHR type-1 versus PHR type-3) may be used for cases when PHR MAC CE is transmitted on an unlicensed cell compared to cases where the PHR MAC CE is transmitted on a licensed cell. This new rule ensures that the gNB is always aware of which PHR type, e.g., type-1 or type-3 PHR, is signaled within a PHR MAC CE.

According to one implementation of the third solution the remote unit 105 always reports using a predefined PHR type, e.g., type-1 PHR, for a serving cell which is configured with two carriers, e.g., SUL and NUL, and for cases when the PHR MAC CE is transmitted on an AUL PUSCH. For scheduled PUSCH transmission on an unlicensed cell, legacy UE reporting behavior with respect to PHR reporting is applied.

One implementation of the third solution maybe described using the following rule: If a UE (remote unit 105) is configured with two UL carriers for a serving cell and if the UE reports a UE capability simultaneousTxSUL-NonSUL for the serving cell, and if a PHR is transmitted on an AUL-PUSCH, then the UE (remote unit 105) provides a Type-1 PHR for the serving cell.

According to a fourth solution, a field in the PHR MAC CE indicates the type of the reported PH value, e.g., whether PHR type-1 or PHR type-3. According to one implementation of the fourth solution, at least one of the 'reserved' fields in the octet where $P_{CMAX}$ is signaled for a serving cell is used for indicating the PHR type. In one implementation one of the reserved fields 'R,' when set to '1', may indicate that the PH value is a type-1 PH value. Accordingly, when set to '0' the corresponding reported PH value is a type-3 PH value. In another implementation both 'R' fields may be used to indicate the PHR type (e.g., to distinguish between up to four different PHR types).

[FIG. 3]

FIG. 3 depicts one embodiment of a MAC PDU format 300 for the PHR MAC CE, according to embodiments of the invention. The MAC PDU format 300 may be used to implement the fourth solution described herein. It should be noted that this shown option should be only understood as an example of an implementation. As depicted, the exemplary MAC PDU format for the PHR MAC CE contains a new field, denoted as 'T,' which indicates the PHR type. One (or both) of the 'R' fields in the octet including $P_{CMAX}$ is reused as the new 'T' field.

According to a fifth solution, the remote unit 105 prioritizes transmission of a PHR MAC CE on a licensed cell over transmissions of a PHR MAC CE on an unlicensed cell. Here, for cases when there are PUSCH resources available for an initial transmission on a licensed cell as well as for an unlicensed cell, the remote unit 105 transmits a PHR MAC CE, e.g., PHR has been triggered before, on the PUSCH resources of the licensed cell. According to one implementation of the fifth solution, where the remote unit 105 is configured with at least one licensed cell and at least one unlicensed cell, then the remote unit 105 always transmits a PHR MAC CE on a licensed cell, e.g., PHR MAC CE are not allowed to be transmitted on an unlicensed cell. According to another implementation of the fifth solution, the remote unit 105 is not to transmit a PHR MAC CE on an AUL-PUSCH. Here, when performing the LCP procedure for an AUL transmission, the remote unit 105 is not to multiplex a PHR MAC CE in the transport block.

According to a sixth solution, a remote unit 105 (e.g., UE) configured with carrier aggregation reports a virtual PHR for a predefined PHR type, e.g., PHR type-1, for a serving cell configured with two UL carriers. Further, the remote unit 105 reports a virtual PHR for other activated serving cells (with configured uplink) for cases when 1) the PHR MAC CE is transmitted on a configured grant, e.g., PUSCH resources allocated by a configured grant, on an unlicensed cell or 2) when the PHR MAC CE is transmitted on a configured grant PUSCH resource and the MAC entity is configured with lch-basedPrioritization. According to this implementation of the sixth solution, remote unit 105 reports for all activated serving cells (with configured uplink) a virtual PHR—for a serving cell configured with two UL carrier a virtual PHR for a predefined PHR type, e.g., PHR type-1.

According to one alternative implementation of the sixth solution, the remote unit 105 reports actual PHR for the serving cell on which the PHR MAC CE is transmitted and reports a virtual PHR for other activated serving cells (with configured uplink). Further, if a serving cell is configured with two UL carriers, then the remote unit 105 reports a virtual PHR for a predefined PHR type for cases when the PHR MAC CE is transmitted on a configured grant on an unlicensed cell or for cases when the PHR MAC CE is transmitted on a configured grant PUSCH resource and the MAC entity is configured with lch-basedPrioritization.

Reporting a predefined/fixed PHR type of a serving cell configured with two UL carriers solves the issue of the base unit 110 (e.g., gNB) not being aware of the reported PHR type. Reporting a virtual PHR solves the issue of the base unit 110 (e.g., gNB) not knowing for which UL resource allocation(s) the PH was calculated. It should be noted that the same problems may also occur for cases when a configured grant PUSCH transmission is pre-empted or deprioritized due to some higher priority UL transmission requiring an overlapping PUSCH resource. For example, the configured grant may be preempted by a later received dynamic UL grant scheduling an overlapping PUSCH resource. Therefore, according to the sixth solution, the remote unit 105 configured with carrier aggregation reports a virtual PHR for a predefined PHR type, e.g., PHR type-1, for a serving cell configured with two UL carriers and reports a virtual PHR for other activated serving cells (with configured uplink) for cases when the MAC entity is configured with lch-basedPrioritization. The condition "configured with lch-basedPrioritization" refers to the case where the network (e.g., base unit 110) configures the remote unit 105 to allow a (low) priority UL transmission to be deprioritized/preempted by some (later) high priority UL grant/transmissions, which is a new feature of the Industrial IOT WI. It is assumed that the prioritization mechanism feature is configured per UE for backward compatibility and separation from UEs not supporting this feature. This terminology may be changed later during further discussions in 3GPP.

According to another embodiment, a remote unit 105 not configured with carrier aggregation reports a virtual PHR for the serving cell for cases when the PHR MAC CE is transmitted on a configured grant, e.g., PUSCH resources allocated by a configured grant, and the serving cell is an unlicensed cell as well as for cases when the PHR MAC CE is transmitted on a configured grant PUSCH resource and the MAC entity is configured with lch-basedPrioritization. According to one implementation of this embodiment UE reports a $P_{CMAX,f,c}$ value within the single-entry PHR MAC CE even for the case that virtual PHR is reported.

Figure 4:
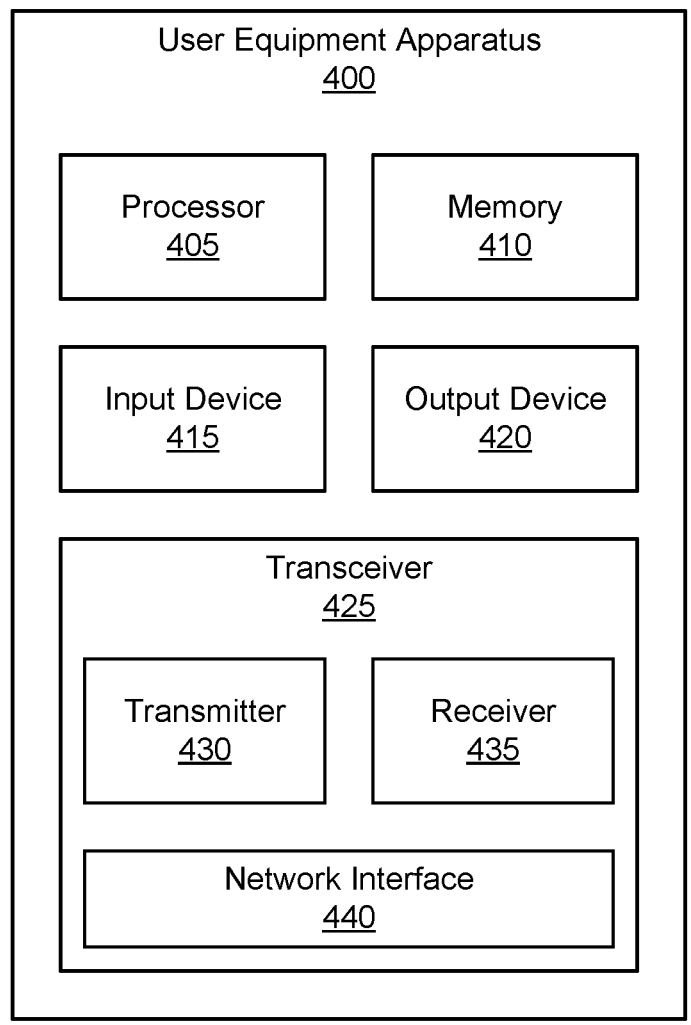
FIG. 4 is a schematic block diagram illustrating one embodiment of a user equipment apparatus that may be used for reporting power headroom.

[FIG. 4—UE Apparatus 400]

FIG. 4 depicts a user equipment apparatus 400 that may be used for PHR reporting, according to embodiments of the disclosure. In various embodiments, the user equipment apparatus 400 is used to implement one or more of the solutions described above. The user equipment apparatus 400 may be one embodiment of the remote unit 105, described above. Furthermore, the user equipment apparatus 400 may include a processor 405, a memory 410, an input device 415, an output device 420, and a transceiver 425. In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 identifies a transmission occasion for AUL transmission on an unlicensed serving cell and generates a PHR MAC CE. The transceiver 425 then transmits the PHR MAC CE with an AUL transmission to a RAN node in the mobile communication network. Here, transmitting the PHR MAC CE includes indicating timing information corresponding to the PHR. In some embodiments, the timing information provides information to the RAN node on the first transmission attempt of the PHR MAC CE. In some embodiments, the timing information includes a one-bit flag, wherein a first value of the one-bit flag indicates that the PHR MAC CE transmission corresponds to a first transmission attempt and a second value of the one-bit flag indicates that the PHR MAC CE transmission corresponds to a subsequent transmission attempt.

In some embodiments, the timing information includes an indication of a timing offset between the PHR MAC CE transmission and a first transmission attempt. In one embodiment, the timing offset indicates a number of slots elapsed since the first transmission attempt. In another embodiment, the timing offset indicates a number of symbols elapsed since the first transmission attempt. In some embodiments, the timing information includes an indication of a number of transmission attempts prior to the PHR transmission. In some embodiments, the timing information is transmitted as part of uplink control information and is encoded separately from the PHR.

In various embodiments, the processor 405 identifies a first transmission occasion for AUL transmission on an unlicensed serving cell. The processor 405 generates a PHR MAC CE including power headroom information for each activated serving cell configured with uplink. Here, the power headroom information for an activated serving cell is calculated for a predetermined PHR type in response to the serving cell being configured with two UL carriers. The transceiver 425 that then transmits the PHR MAC CE in an AUL transmission to a RAN node in the mobile communication network. In some embodiments, the processor 405 prioritizes transmitting the PHR MAC CE on a licensed cell over transmitting the PHR on the unlicensed serving cell.

In various embodiments, the processor 405 identifies a first transmission occasion on a configured uplink grant resource. The processor 405 generates a PHR MAC CE including power headroom information for each activated serving cell. Here, the power headroom information is calculated for a predetermined PHR type in response to a serving cell being configured with two UL carriers. The transceiver 425 then transmits the PHR MAC CE in a configured grant transmission to a RAN node in the mobile communication network.

In some embodiments, generating the PHR MAC CE includes reporting a virtual power headroom for each activated serving cell in response to the PHR MAC CE being transmitted on a configured uplink grant and further in response to a MAC entity of the user equipment apparatus 400 being configured to deprioritize a lower priority uplink transmission in favor of a higher priority uplink transmission. In such embodiments, preparing the PHR MAC CE includes reporting a virtual PHR for a predefined PHR type in response to a serving cell being configured with two UL carriers.

In some embodiments, that user equipment apparatus 400 is configured for carrier aggregation using multiple activated serving cells, wherein preparing the PHR MAC CE includes reporting an actual PHR for the serving cell on which the PHR MAC CE is to be transmitted and reporting virtual PHR for one or more other activated serving cells.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to power headroom reporting. For example, the memory 410 may store PH values, AUL data, AUL configuration information, timing offsets, and the like. In certain embodiments, the memory 410 also stores program code and related data, such as an operating system or other controller algorithms operating on the remote unit 105.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

As discussed above, the transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 may include one or more transmitters 430 and one or more receivers 435. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. Additionally, the transceiver 425 may support at least one network interface 440. Here, the at least one network interface 440 facilitates communication with a RAN node, such as an eNB or gNB, for example using the "Uu" interface. Additionally, the at least one network interface 440 may include an interface used for communications with one or more network functions in the mobile core network, such as a UPF, an AMF, and/or a SMF.

In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an application-specific integrated circuit ("ASIC"), or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
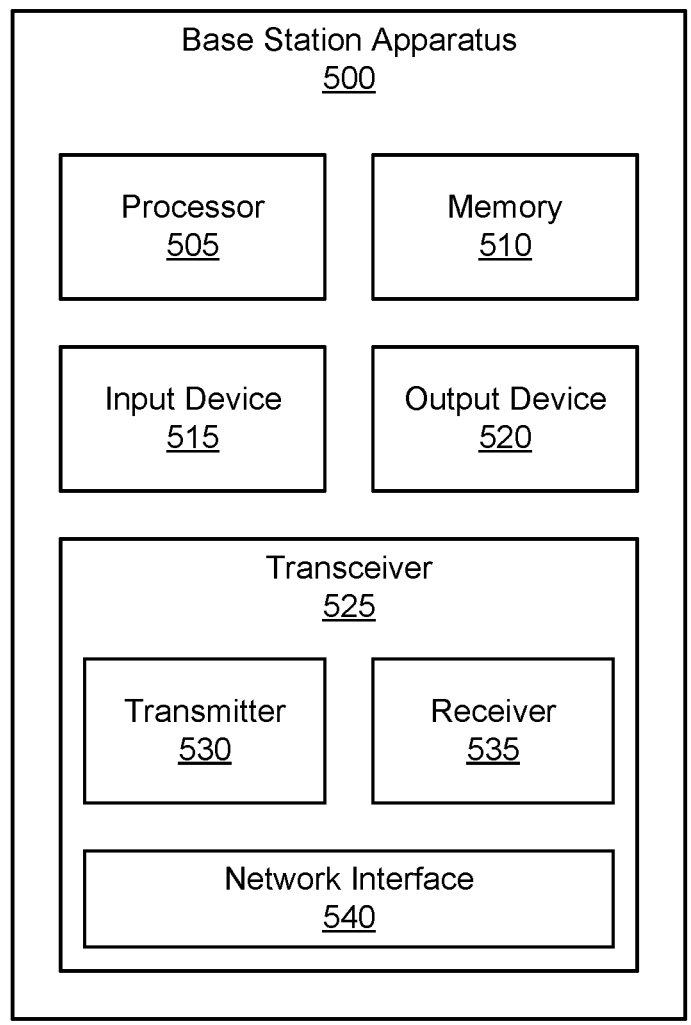
FIG. 5 is a schematic block diagram illustrating one embodiment of a base station apparatus that may be used for reporting power headroom.

[FIG. 5—GNB that Receives PHR]

FIG. 5 depicts a base station apparatus 500 that may be used for reporting power headroom, according to embodiments of the disclosure. The base station apparatus 500 may be one embodiment of the remote unit 105 or UE, described above. Furthermore, the base station apparatus 500 may include a processor 505, a memory 510, an input device 515, an output device 520, and a transceiver 525. In some embodiments, the input device 515 and the output device 520 are combined into a single device, such as a touchscreen. In certain embodiments, the base station apparatus 500 may not include any input device 515 and/or output device 520. In various embodiments, the base station apparatus 500 may include one or more of: the processor 505, the memory 510, and the transceiver 525, and may not include the input device 515 and/or the output device 520.

The processor 505, in one embodiment, may include any known controller capable of executing computer-readable instructions and/or capable of performing logical operations. For example, the processor 505 may be a microcontroller, a microprocessor, a CPU, a GPU, an auxiliary processing unit, a FPGA, or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the base station apparatus 500 receives (e.g., via the transceiver 525) a PHR from a served UE. Additionally, the base station apparatus 500 may receive timing information relating to the PHR, as described herein. Using the timing information, the processor 505 interprets the reported power headroom values.

In various embodiments, the processor 505 identifies a number of uplink carriers for a serving cell of the UE. The processor 505 may use the configuration of uplink carriers to interpret the reported power headroom values, for example inferring PHR type (e.g., type-1 or type-3) from the uplink carrier configuration and/or inferring actual or virtual PHR from the uplink carrier configuration.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to reporting power headroom. For example, the memory 510 may store PH timing information, UL carrier configurations, PHR values, and the like. In certain embodiments, the memory 510 also stores program code and related data, such as an operating system or other controller algorithms operating on the remote unit 105.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the base station apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to communicate with the UE, as described herein. Similarly, one or more receivers 535 may be used to communicate with other network functions in the PLMN, as described herein. Although only one transmitter 530 and one receiver 535 are illustrated, the base station apparatus 500 may have any suitable number of transmitters 530 and receivers 535. Further, the transmitter(s) 525 and the receiver(s) 530 may be any suitable type of transmitters and receivers.

[AUL UE Method 600]

Figure 6:
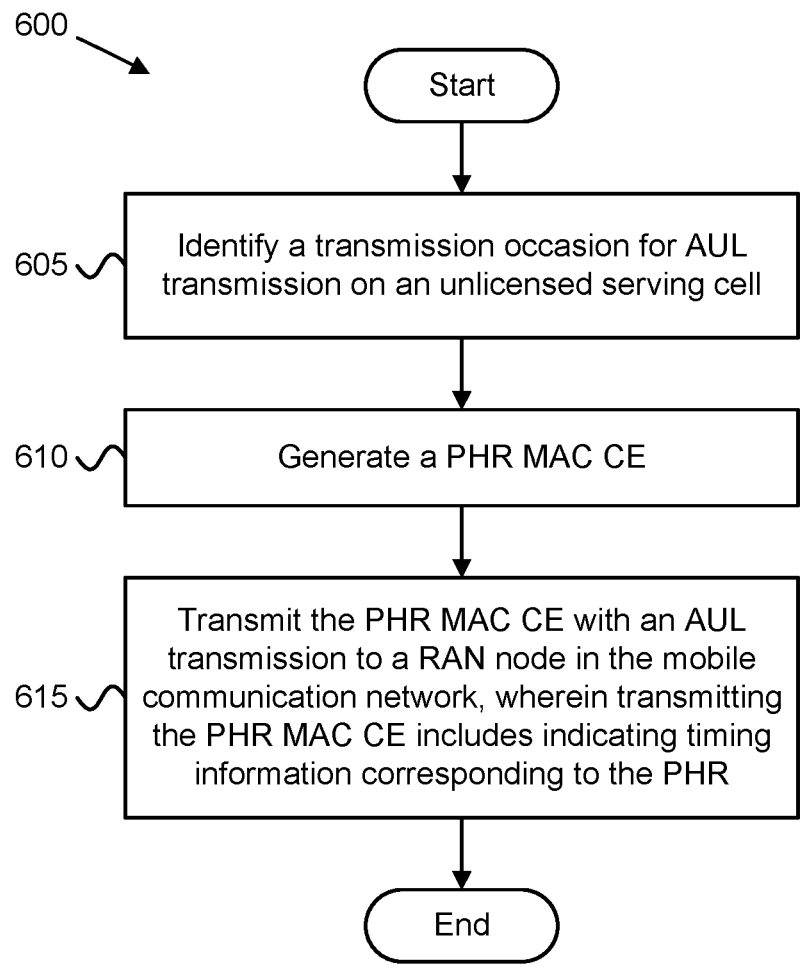
FIG. 6 is a block diagram illustrating one embodiment of a method for reporting power headroom.

FIG. 6 depicts one embodiment of a method 600 for reporting power headroom, according to embodiments of the disclosure. In various embodiments, the method 600 is performed by the remote unit 105 and/or the user equipment apparatus 400, described above. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins and identifies 605 a transmission occasion for AUL transmission on an unlicensed serving cell. The method 600 includes generating 610 a PHR MAC CE. The method 600 includes transmitting 615 the PHR MAC CE with an AUL transmission to a RAN node in the mobile communication network. Here, transmitting the PHR MAC CE includes indicating timing information corresponding to the PHR. The method 600 ends.

[AUL+CA UE Method 700]

Figure 7:
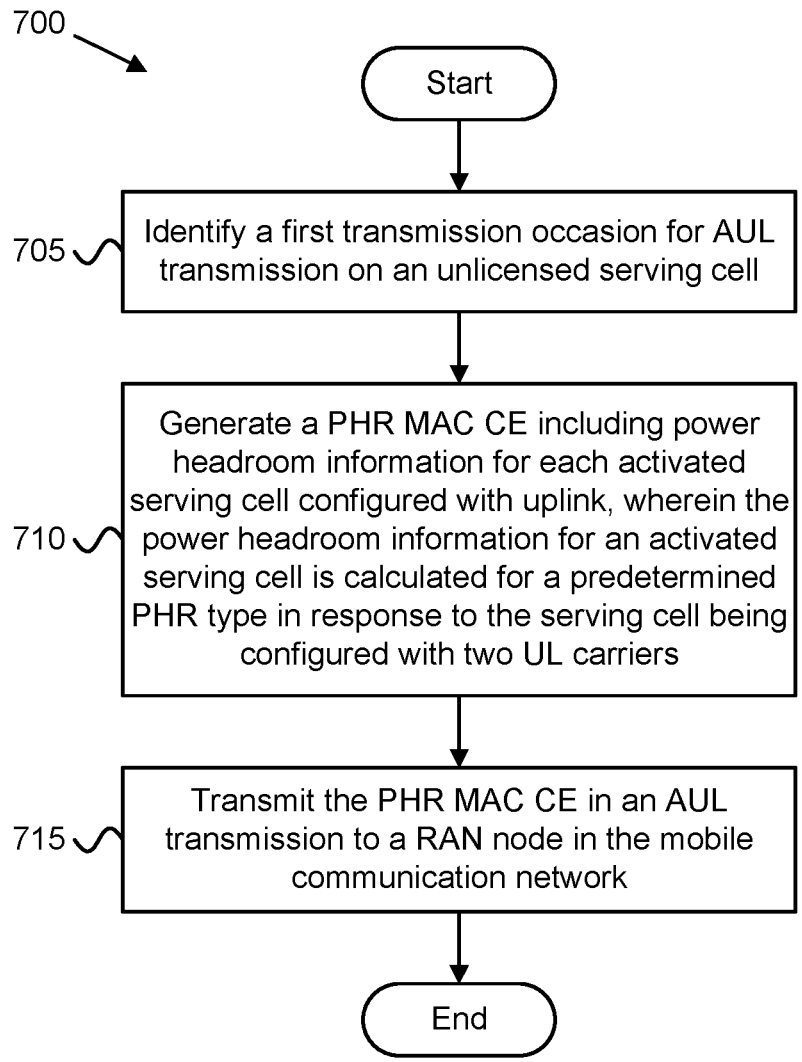
FIG. 7 is a block diagram illustrating another embodiment of a method for reporting power headroom.

FIG. 7 depicts one embodiment of a method 700 for reporting power headroom, according to embodiments of the disclosure. In various embodiments, the method 700 is performed by a UE, such as the remote unit 105 and/or the user equipment apparatus 400, described above. In some embodiments, the method 700 is performed by a processor, such as a microcontroller, a microprocessor, a central processing unit (CPU), a graphics processing unit (GPU), an auxiliary processing unit, a FPGA, or the like.

The method 700 begins and identifies 705 a first transmission occasion for AUL transmission on an unlicensed serving cell. The method 700 includes generating 710 a PHR MAC CE including power headroom information for each activated serving cell configured with uplink. Here, the power headroom information for an activated serving cell is calculated for a predetermined PHR type in response to the serving cell being configured with two UL carriers. The method 800 includes transmitting 715 the PHR MAC CE in an AUL transmission to a RAN node in the mobile communication network. The method 700 ends.

[CA UE Method 800]

Figure 8:
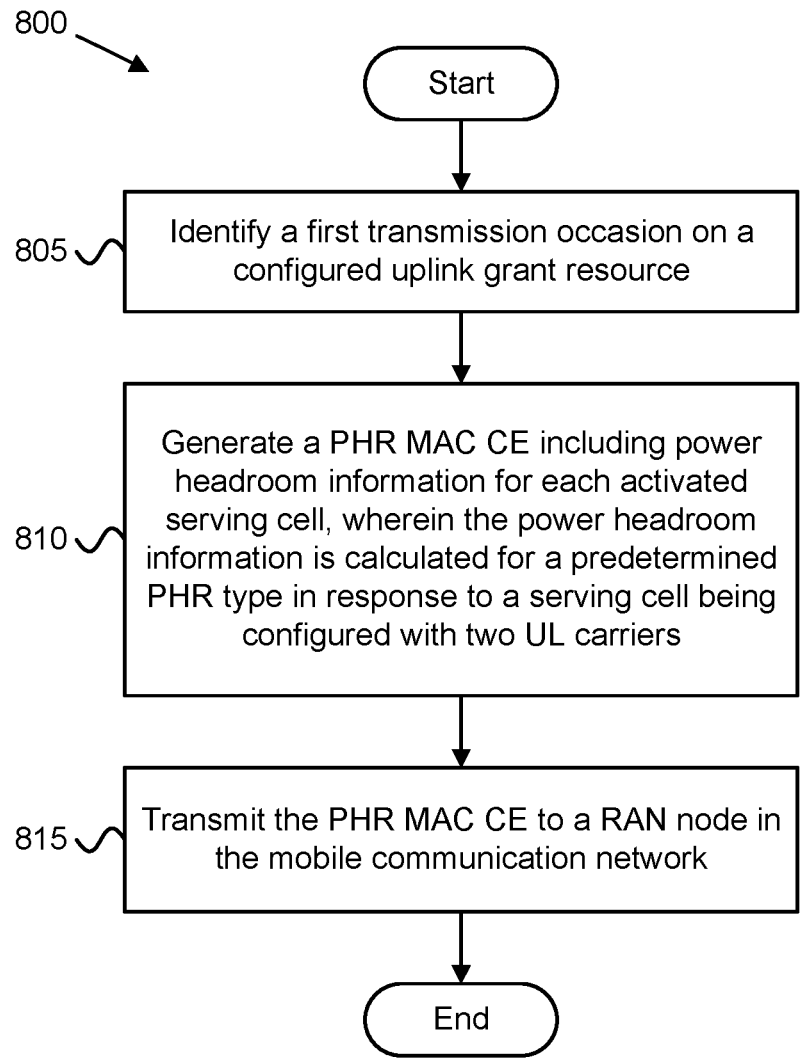
FIG. 8 is a block diagram illustrating a further embodiment of a method for reporting power headroom.

FIG. 8 depicts one embodiment of a method 800 for reporting power headroom, according to embodiments of the disclosure. In various embodiments, the method 800 is performed by a UE, such as the remote unit 105 and/or the user equipment apparatus 400, described above. In some embodiments, the method 800 is performed by a processor, such as a microcontroller, a microprocessor, a central processing unit (CPU), a graphics processing unit (GPU), an auxiliary processing unit, a FPGA, or the like.

The method 800 begins and identifies 805 a first transmission occasion on a configured uplink grant resource. The method 800 includes generating 810 a PHR MAC CE including power headroom information for each activated serving cell.

The method 800 includes transmitting 815 the PHR MAC CE to a RAN node in the mobile communication network. Here, the power headroom information is calculated for a predetermined PHR type in response to a serving cell being configured with two UL carriers. The method 800 ends.

[Claim Statements]

[AUL UE Apparatus]

Disclosed herein is a first apparatus for reporting power headroom, according to embodiments of the disclosure. The first apparatus may be implemented by a UE, such as the remote unit 105 and/or the user equipment apparatus 400. The first apparatus includes a processor that identifies a transmission occasion for AUL transmission on an unlicensed serving cell and generates a PHR MAC CE. The first apparatus includes a transceiver that transmits the PHR MAC CE with an AUL transmission to a RAN node in the mobile communication network, wherein transmitting the PHR MAC CE includes indicating timing information corresponding to the PHR.

In some embodiments, the timing information provides information to the RAN node on the first transmission attempt of the PHR MAC CE. In some embodiments, the timing information includes a one-bit flag, wherein a first value of the one-bit flag indicates that the PHR MAC CE transmission corresponds to a first transmission attempt and a second value of the one-bit flag indicates that the PHR MAC CE transmission corresponds to a subsequent transmission attempt.

In some embodiments, the timing information includes an indication of a timing offset between the PHR MAC CE transmission and a first transmission attempt. In one embodiment, the timing offset indicates a number of slots elapsed since the first transmission attempt. In another embodiment, the timing offset indicates a number of symbols elapsed since the first transmission attempt.

In some embodiments, the timing information includes an indication of a number of transmission attempts prior to the PHR transmission. In some embodiments, the timing information is transmitted as part of uplink control information and is encoded separately from the PHR.

[AUL UE Method]

Disclosed herein is a first method for reporting power headroom, according to embodiments of the disclosure. The first method may be performed by a UE, such as the remote unit 105 and/or the user equipment apparatus 400. The first method includes identifying a transmission occasion for AUL transmission on an unlicensed serving cell. The first method includes generating a PHR MAC CE and transmitting the PHR MAC CE with an AUL transmission to a RAN node in the mobile communication network, wherein transmitting the PHR MAC CE includes indicating timing information corresponding to the PHR.

In some embodiments of the first method, the timing information provides information to the RAN node on the first transmission attempt of the PHR MAC CE. In some embodiments of the first method, the timing information includes a one-bit flag, wherein a first value of the one-bit flag indicates that the PHR MAC CE transmission corresponds to a first transmission attempt and a second value of the one-bit flag indicates that the PHR MAC CE transmission corresponds to a subsequent transmission attempt.

In some embodiments of the first method, the timing information includes an indication of a timing offset between the PHR MAC CE transmission and a first transmission attempt. In one embodiment, the timing offset indicates a number of slots elapsed since the first transmission attempt. In another embodiment, the timing offset indicates a number of symbols elapsed since the first transmission attempt.

In some embodiments of the first method, the timing information includes an indication of a number of transmission attempts prior to the PHR transmission. In some embodiments of the first method, the timing information is transmitted as part of uplink control information and is encoded separately from the PHR.

[AUL+CA UE Apparatus]

Disclosed herein is a second apparatus for reporting power headroom, according to embodiments of the disclosure. The second apparatus may be implemented by a UE configured for carrier aggregation using multiple serving cells for power headroom reporting in a mobile communication network, such as the remote unit 105 and/or the user equipment apparatus 400. The second apparatus includes a processor that identifies a first transmission occasion for AUL transmission on an unlicensed serving cell. The processor generates a PHR MAC CE including power headroom information for each activated serving cell configured with uplink, wherein the power headroom information for an activated serving cell is calculated for a predetermined PHR type in response to the serving cell being configured with two UL carriers. The second apparatus includes a transceiver that transmits the PHR MAC CE in an AUL transmission to a RAN node in the mobile communication network.

In some embodiments, the processor prioritizes transmitting the PHR MAC CE on a licensed cell over transmitting the PHR on the unlicensed serving cell.

[AUL+CA UE Method]

Disclosed herein is a second method for reporting power headroom, according to embodiments of the disclosure. The second method may be performed by a UE configured for carrier aggregation using multiple serving cells for power headroom reporting in a mobile communication network, such as the remote unit 105 and/or the user equipment apparatus 400. The second method includes identifying a first transmission occasion for AUL transmission on an unlicensed serving cell and generating a PHR MAC CE including power headroom information for each activated serving cell configured with uplink, wherein the power headroom information for an activated serving cell is calculated for a predetermined PHR type in response to the serving cell being configured with two UL carriers. The second method includes transmitting the PHR MAC CE in an AUL transmission to a RAN node in the mobile communication network.

In some embodiments, the second method further includes prioritizing transmission of the PHR MAC CE on a licensed cell over transmitting the PHR on the unlicensed serving cell.

[CA UE Apparatus]

Disclosed herein is a third apparatus for reporting power headroom, according to embodiments of the disclosure. The third apparatus may be implemented by a UE configured with carrier aggregation for power headroom reporting in a mobile communication network, such as the remote unit 105 and/or the user equipment apparatus 400. The third apparatus includes a processor that identifies a first transmission occasion on a configured uplink grant resource and generates a PHR MAC CE including power headroom information for each activated serving cell, wherein the power headroom information is calculated for a predetermined PHR type in response to a serving cell being configured with two UL carriers. The third apparatus includes a transceiver that transmits the PHR MAC CE in a configured grant transmission to a RAN node in the mobile communication network.

In some embodiments, generating the PHR MAC CE includes reporting a virtual power headroom for each activated serving cell in response to the PHR MAC CE being transmitted on a configured uplink grant and further in response to a MAC entity of the apparatus being configured to deprioritize a lower priority uplink transmission in favor of a higher priority uplink transmission. In such embodiments, preparing the PHR MAC CE includes reporting a virtual PHR for a predefined PHR type in response to a serving cell being configured with two UL carriers.

In some embodiments, that apparatus is configured for carrier aggregation using multiple activated serving cells, wherein preparing the PHR MAC CE includes reporting an actual PHR for the serving cell on which the PHR MAC CE is to be transmitted and reporting virtual PHR for one or more other activated serving cells.

[CA UE Method]

Disclosed herein is a third method for reporting power headroom, according to embodiments of the disclosure. The third method may be performed by a UE configured with carrier aggregation for power headroom reporting in a mobile communication network, such as the remote unit 105 and/or the user equipment apparatus 400. The third method includes identifying a first transmission occasion on a configured uplink grant resource. The third method includes generating a PHR MAC CE including power headroom information for each activated serving cell and transmitting the PHR MAC CE to a RAN node in the mobile communication network. Here, the power headroom information is calculated for a predetermined PHR type in response to a serving cell being configured with two UL carriers.

In some embodiments of the third method, generating the PHR MAC CE includes reporting a virtual power headroom for each activated serving cell in response to the PHR MAC CE being transmitted on a configured uplink grant and further in response to a MAC entity of the UE being configured to deprioritize a lower priority uplink transmission in favor of a higher priority uplink transmission. In such embodiments, preparing the PHR MAC CE includes reporting a virtual PHR for a predefined PHR type in response to a serving cell being configured with two UL carriers.

In some embodiments of the third method, the UE is configured for carrier aggregation using multiple activated serving cells, wherein preparing the PHR MAC CE includes reporting an actual PHR for the serving cell on which the PHR MAC CE is to be transmitted and reporting virtual PHR for one or more other activated serving cells.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment ("UE") for power headroom reporting in a mobile communication network, the method comprising:
   identifying a transmission occasion for autonomous uplink ("AUL") transmission on an unlicensed serving cell;
   generating a power headroom report ("PHR") Medium Access Control ("MAC") Control Element ("CE"); and
   transmitting the PHR MAC CE with an AUL transmission to a radio access network ("RAN") node in the mobile communication network,
   wherein transmitting the PHR MAC CE comprises indicating timing information corresponding to the PHR, wherein the timing information indicates a time when the power headroom information was generated.

2. The method of claim 1, wherein the timing information provides information to the RAN node on a first transmission attempt of the PHR MAC CE.

3. The method of claim 1, wherein the timing information comprises a one-bit flag, wherein a first value of the one-bit flag indicates that the PHR MAC CE transmission corresponds to a first transmission attempt and a second value of the one-bit flag indicates that the PHR MAC CE transmission corresponds to a subsequent transmission attempt.

4. The method of claim 1, wherein the timing information comprises an indication of a timing offset between the PHR MAC CE transmission and a first transmission attempt.

5. The method of claim 1, wherein the timing information is transmitted as part of uplink control information and is encoded separately from the PHR.

6. A user equipment ("UE") apparatus for power headroom reporting in a mobile communication network, the apparatus comprising:
   a processor that:
      identifies a transmission occasion for autonomous uplink ("AUL") transmission on an unlicensed serving cell, and
      generates a power headroom report ("PHR") Medium Access Control ("MAC") Control Element ("CE"); and
   a transceiver that transmits the PHR MAC CE with an AUL transmission to a radio access network ("RAN") node in the mobile communication network,
   wherein transmitting the PHR MAC CE comprises indicating timing information corresponding to the PHR, wherein the timing information indicates a time when the power headroom information was generated.

7. The apparatus of claim 6, wherein the timing information provides information to the RAN node on a first transmission attempt of the PHR MAC CE.

8. The apparatus of claim 6, wherein the timing information comprises a one-bit flag, wherein a first value of the one-bit flag indicates that the PHR MAC CE transmission corresponds to a first transmission attempt and a second value of the one-bit flag indicates that the PHR MAC CE transmission corresponds to a subsequent transmission attempt.

9. The apparatus of claim 6, wherein the timing information comprises an indication of a timing offset between the PHR MAC CE transmission and a first transmission attempt.

10. The apparatus of claim 6, wherein the timing information is transmitted as part of uplink control information and is encoded separately from the PHR.

\* \* \* \* \*